Figure 1:
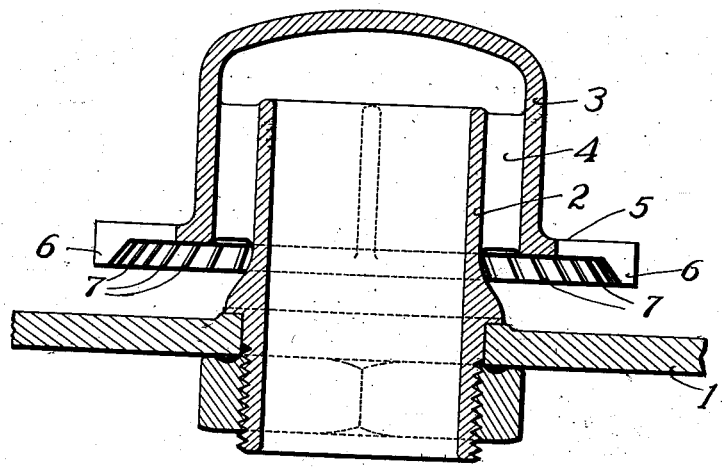

W. E. LUMMUS.
BOILING CAP.
APPLICATION FILED FEB. 8, 1908.

973,795.

Patented Oct. 25, 1910.

Witnesses:

Inventor:
Walter E. Lummus
by his Attorneys

UNITED STATES PATENT OFFICE.

WALTER E. LUMMUS, OF LYNN, MASSACHUSETTS.

BOILING-CAP.

973,795. Specification of Letters Patent. Patented Oct. 25, 1910.

Application filed February 8, 1908. Serial No. 414,883.

*To all whom it may concern:*

Be it known that I, WALTER E. LUMMUS, a citizen of the United States, residing at Lynn, in the county of Essex and State of Massachusetts, have invented certain new and useful Improvements in Boiling-Caps; and I do hereby declare the following to be a full, clear, and exact description of the invention, such as will enable others skilled in the art to which it appertains to make and use the same.

The present invention relates to an improvement in boiling caps for use in distilling apparatus.

The rectifying column has become the most efficient distilling apparatus for separating volatile liquids. It consists of a series of superposed communicating chambers or vessels in which the vapor from one chamber enters the chamber above and by giving up its heat to the liquid contained therein causes that liquid to boil and in turn to give off vapor. Each chamber has overflow or downflow pipes for carrying off of the excess of liquid therein. A boiling cap consisting of a vapor tube rising from the floor of the chamber above the level of the liquid in the chamber, and having a hood or cap which covers the open end of the tube, and then is extended downward below the surface of the liquid, is the ordinary means provided to conduct the vapor product of a lower chamber to the next one above and to introduce it into the liquid of the chamber to condense such vapor and to boil the liquid therein. The ordinary boiling cap, however, allows the vapor to rise through the liquid, while in contact with the cap, and the vapor, instead of coming into intimate contact with the liquid in the chamber, rises in contact with the hot cap and is not thoroughly washed by intimate contact with the liquid. Again, it does not distribute the vapor evenly throughout the liquid, nor secure the complete envelopment of the bubbles, nor effect a minute subdivision of the vapor, nor does it set up the requisite currents to maintain a uniform quality of the liquid. One improvement on this boiling cap consisted in providing the lower edge of the cap with a series of serrations for the purpose of effecting a more uniform distribution of the vapor in the liquid, thereby causing a more thorough washing of the vapor as the result of such more uniform distribution. Another improvement consisted in providing the cap with a series of vertical slots through which the vapor passed into the liquid. This construction, however, while it secured a more minute sub-division of the vapor for its passage through the liquid, permitted portions of vapor emerging from the upper ends of the slots to pass through a less depth of liquid than that emerging from the lower portions of the slots, with the result that the vapor was not uniformly washed in its passage through the liquid. Again, it caused excessive local ebullition of the liquid and permitted contact of the vapor with the hot walls of the cap.

The present construction contemplates the employment of a horizontal plate in the distilling vessel located below the normal level of the liquid therein but substantially above the bottom of the vessel, and a vapor conductor which leads the incoming vapor into the vessel above the level of the liquid therein and discharges it under the plate, thereby causing it to flow in a thin layer for a substantial distance in a horizontal direction and with the lower surface of the layer in contact with the liquid. The vapor flows in this manner to or toward the edge or edges of the plate and then escapes beneath the edge or through slots in the plate and bubbles up through the liquid, being then completely enveloped by the liquid; by this means more thorough washing of the vapor is secured, also long contact of vapor and liquid by means of which the liquid is heated and the more readily condensable constituents of the vapor are condensed, also all of the vapor is caused to pass into the liquid at the same depth and wide dispersion of the vapor in the liquid is secured.

The invention also contemplates other features of improvement hereinafter pointed out and particularly defined in the claims.

To this end in the illustrated embodiment of the invention the lower edge of the boiling cap is provided with a lateral horizontally extended flange constituting the plate above referred to which causes the vapor to move horizontally outward and to be introduced into the liquid at a distance from the hot walls of the boiling cap, at a uniform depth in the liquid and at a place in the liquid where it will set up useful circulatory currents. This flange is provided with a series of radial slots of uniform length and uniform depth in the liquid through which the vapor emerges.

The invention consists in the distilling apparatus hereinafter described and particularly defined in the claims.

Figure 2:
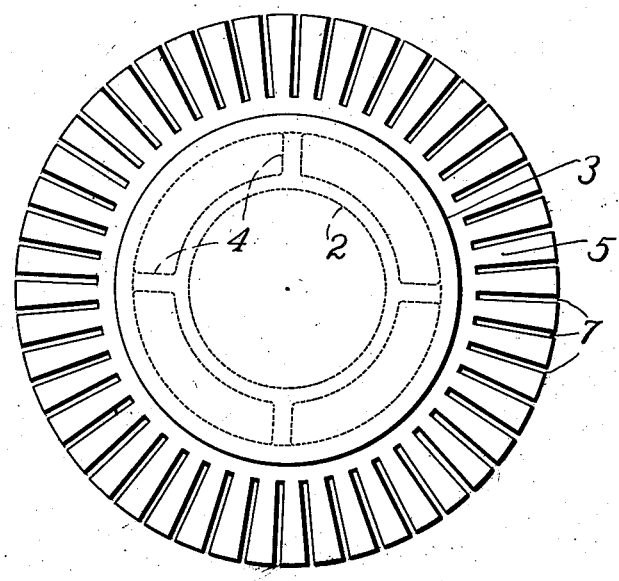

The accompanying drawing illustrates the preferred embodiment of the invention, in the form of a boiling cap, Figure 1 being a vertical section and Fig. 2 a plan.

The illustrated embodiment is described as follows:—The floor of the chamber or distilling vessel is indicated by the reference character 1. The boiling cap consists of a vapor tube 2 set in a hole in the floor 1, screw-threaded on its lower end and secured in place by a nut. The tube carries the cap 3 which is made integral with the vapor tube, webs 4 being provided to unite the tube and cap. The vapor tube and cap taken together constitute a vapor conductor leading the vapor into the distilling vessel, conducting it first above the level of the liquid so as to prevent back-flow of liquid therethrough and then below the level of the liquid where it is discharged. From the lower edge of the cap 3 extends outwardly the horizontal vapor distributing flange 5 thickened at its edge to produce a lip 6 which extends downward somewhat below the under surface of the main portion of the flange 5. This flange constitutes a submerged vapor distributing plate, under which the vapor is discharged by the vapor conductor. The flange is provided with a series of radial slots 7 which begin at the edge of the flange and extend inwardly to a point short of the outer surface of the cap.

In operation the vapor rises through the vapor tube 2 above the normal level of the liquid in the chamber or distilling vessel and passes down between the cap and the vapor tube and then flows outwardly in a thin layer along the underside of the flange and escapes upward through the slots into the liquid surrounding the cap. It will be observed that by causing the vapor to pass in a horizontal direction along under the flange of the cap, it is exposed to the washing action of the liquid and at the same time it there begins to give up its heat to the liquid. Furthermore that upon the amount of vapor passing through the cap will depend the extent to which the vapor will extend outward along the underside of the flange. In this respect the vapor distributing flange automatically takes care of widely varying quantities of vapor without, as in one of the caps referred to, subjecting it to a different depth of immersion in the liquid. When the amount of vapor passing through the cap is such as to exceed the capacity of the slots, then the vapor will press down the liquid under the flange until the vapor may escape around the edge of the flange; the vapor which so escapes is subjected to substantially the same amount of washing as the vapor which passes through the slots. It will be observed that the vapor passing into the liquid through the slots and around the edge of the flange is all introduced into the liquid at a uniform depth and in a finely divided condition without being exposed to contact with the hot cap and at a place in the liquid where it is completely enveloped by the liquid so that it is widely diffused throughout the liquid and its identity is destroyed as much as possible by condensation in the liquid which is heated thereby and evolves a vapor having a composition unlike the composition of the vapor which enters the liquid. The film of vapor flowing out of a slot into the liquid is as thick as the width of the slot, and, as a consequence, no portion of the vapor is admitted to the liquid at a greater distance from the liquid than one-half the width of the slot. The maximum distance from the liquid at which the vapor should enter the liquid varies with different substances. In the case of crude methyl alcohol, for example, no portion of the vapor should be admitted to the liquid at a greater distance than 1/32 of an inch, consequently the slots in the flange of the boiling cap for use in connection with crude methyl alcohol should not exceed 1/16 of an inch in width. In general, the width of the slots may be said to depend upon the heat conductivity of the vapor and the liquid; thus, with vapors and liquids of greater conductivity, wider slots may be used, while with vapors and liquids of lower conductivity, narrower slots may be used; and in all cases provision should be had for discharging the vapor into the liquid at a sufficient distance from the hot cap so that the bubbles shall be completely enveloped by the liquid, introducing the vapor into the liquid at uniform depths, and causing the liquid to travel horizontally under a submerged plate in contact with the liquid. In the case of vapors or gases which offer high resistance to the washing operation, and which therefore require exposure in exceedingly thin films, wider flanges are used, thus increasing the ratio of the rim circumference to the capacity of the vapor conductor and diminishing the thickness of the vapor films.

The use of the slotted flange, or its equivalent, contributes to obtaining the best results for the reason that it breaks up the vapor into fine bubbles, thereby causing an intimate contact of vapor and liquid. The provision of the widened edge or lip of the flange is useful where it is desired to provide for wide variations in the capacity of the apparatus, for under ordinary working conditions all of the vapor will escape through the slots, but when the capacity of these openings is exceeded, the increased pressure will, after first compelling a complete use of the slots to the extent of their capacity, then permit the excess of gas to escape under the depressed lip which thus affords a reserve capacity.

It is to be observed that this boiling cap is made of material of sufficient thickness to be rigid, and, therefore, that it will retain its shape and the position of its parts with relation to the supporting floor of the distilling vessel.

The principal advantage of the present construction, stated broadly, is the enhanced effective capacity of the cap. By the use of this cap a smaller column and fewer chambers may be employed to accomplish the same degree of separation as a much larger apparatus of other known forms.

While I have used the expression "distilling apparatus" and have described herein certain operations ordinarily recognized as distilling operations, I do not intend thereby to limit the invention to use in such connections, as it may be employed in other apparatus performing analogous operations not ordinarily recognized as distilling operations.

Having thus described the invention, what is claimed is:—

1. A boiling cap for distilling apparatus having a vapor tube and a cap provided with a horizontal vapor-distributing flange, said flange being provided with slots of uniform width beginning at the periphery of the flange and extending inwardly equal distances and terminating short of the outer surface of the cap, causing the vapor, as it enters the liquid in the distilling vessel, to be discharged in films of uniform thickness, substantially as described.

2. A boiling cap for distilling apparatus having a vapor tube and a cap provided with a horizontal vapor-distributing flange under which the vapor is discharged, said flange being provided with slots of uniform width extending from the edge of the flange inwardly equal distances and terminating short of the outer surface of the cap, causing the vapor, as it enters the liquid in the distilling vessel, to be discharged in films of uniform thickness, and a lip at its edge compelling a complete use of the slots to the extent of their capacity before the vapor is allowed to escape at the edge of the flange, the flange being located at all points at a uniform distance below the level of the liquid adapted to be contained in the distilling vessel, substantially as described.

In testimony whereof I affix my signature, in presence of two witnesses.

WALTER E. LUMMUS.

Witnesses:
 HORACE VAN EVEREN,
 ALICE ACKROYD.